US012675834B2

(12) United States Patent
Shim et al.

(10) Patent No.: US 12,675,834 B2
(45) Date of Patent: Jul. 7, 2026

(54) METHOD AND DEVICE FOR ANALYZING BATTLEFIELD THREAT BASED ON DYNAMIC GRAPH NEURAL NETWORK

(71) Applicant: AGENCY FOR DEFENSE DEVELOPMENT, Daejeon (KR)

(72) Inventors: Sangheun Shim, Daejeon (KR); Dong Kuk Ryu, Daejeon (KR); Kiwoong Park, Daejeon (KR)

(73) Assignee: Agency for Defense Development, Daejeon (KR)

( * ) Notice: Subject to any disclaimer, the term of this patent is extended or adjusted under 35 U.S.C. 154(b) by 113 days.

(21) Appl. No.: 18/680,225

(22) Filed: May 31, 2024

(65) Prior Publication Data

US 2026/0038070 A1 Feb. 5, 2026

(30) Foreign Application Priority Data

Jun. 8, 2023 (KR) ........................ 10-2023-0073712

(51) Int. Cl.
*G06Q 30/00* (2023.01)
*G06Q 10/063* (2023.01)
*G06Q 50/26* (2024.01)

(52) U.S. Cl.
CPC ........... *G06Q 50/26* (2013.01); *G06Q 10/063* (2013.01)

(58) Field of Classification Search
None
See application file for complete search history.

(56) References Cited

U.S. PATENT DOCUMENTS

| | | | | |
|---|---|---|---|---|
| 2009/0087029 A1* | 4/2009 | Coleman | .............. | G06V 10/255 |
| | | | | 382/103 |
| 2017/0208085 A1* | 7/2017 | Steelman | ............ | H04L 63/1433 |
| 2018/0113198 A1* | 4/2018 | Labreuche | ................ | G01S 7/22 |
| 2019/0005946 A1* | 1/2019 | Huang | .................... | G10L 15/04 |
| 2020/0073932 A1* | 3/2020 | Jia | ........................ | G06F 16/9024 |
| 2020/0285932 A1* | 9/2020 | Singh | .................... | G06N 3/045 |
| 2021/0318693 A1* | 10/2021 | Lee | ...................... | G05D 1/0274 |

(Continued)

FOREIGN PATENT DOCUMENTS

| | | |
|---|---|---|
| KR | 10-2147855 B1 | 8/2020 |
| KR | 10-2022-0160398 A | 12/2022 |

(Continued)

OTHER PUBLICATIONS

Advancing Autonomous Systems, RAND Corporation, Martin et al., Jan. 4, 2019. (Year: 2019).*

(Continued)

*Primary Examiner* — Matthew T Sittner
(74) *Attorney, Agent, or Firm* — Knobbe, Martens, Olson & Bear, LLP

(57) ABSTRACT

Proposed is a method and device for analyzing battlefield threat based on a dynamic graph neural network. The method may include classifying a behavior at a specific time point for a plurality of objects in a battlefield based on battlefield information received from the outside. The method may also include predicting a threat occurrence probability between the plurality of objects according to the classified behavior. The method may further include generating and outputting a battlefield threat analysis result including the classified behavior and the threat occurrence probability.

13 Claims, 4 Drawing Sheets

(56)                     References Cited

U.S. PATENT DOCUMENTS

| | | | |
|---|---|---|---|
| 2022/0327461 A1* | 10/2022 | Meehan | G06Q 10/063114 |
| 2023/0084278 A1* | 3/2023 | Baek | G06F 17/16 |
| | | | 706/46 |
| 2023/0132315 A1* | 4/2023 | Hershey | G06N 20/00 |
| | | | 706/11 |
| 2023/0196727 A1* | 6/2023 | Govardhanam | G06V 10/82 |
| | | | 382/181 |
| 2024/0290071 A1* | 8/2024 | Liu | G06V 10/761 |

FOREIGN PATENT DOCUMENTS

| | | |
|---|---|---|
| KR | 10-2022-0170687 A | 12/2022 |
| KR | 10-2023-0018941 A | 2/2023 |

OTHER PUBLICATIONS

Ceruti and Kaina, "Enhancing Dependability of the Battlefield Single Integrated Picture through Metrics for Modeling and Simulation of Time-Critical Scenarios," 2003 (Year: 2003).*
Office Action dated Aug. 28, 2023 in Korean Application No. 10-2023-0073712, in 6 pages.
Notice of Allowance dated Jan. 24, 2024 in Korean Application No. 10-2023-0073712, in 6 pages.

* cited by examiner

FIG.4

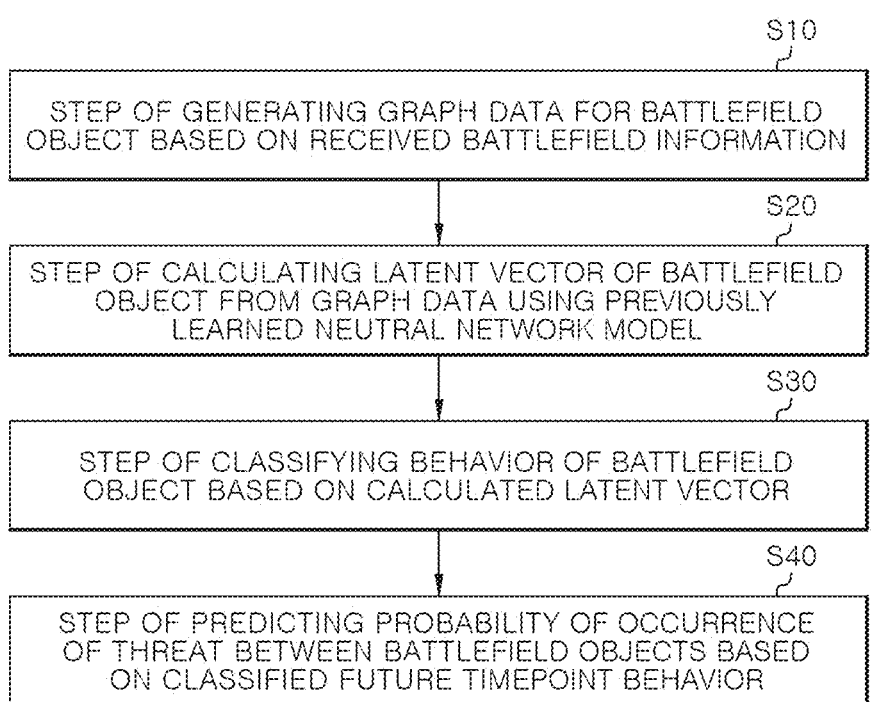

S10

STEP OF GENERATING GRAPH DATA FOR BATTLEFIELD
OBJECT BASED ON RECEIVED BATTLEFIELD INFORMATION

S20

STEP OF CALCULATING LATENT VECTOR OF BATTLEFIELD
OBJECT FROM GRAPH DATA USING PREVIOUSLY
LEARNED NEUTRAL NETWORK MODEL

S30

STEP OF CLASSIFYING BEHAVIOR OF BATTLEFIELD
OBJECT BASED ON CALCULATED LATENT VECTOR

S40

STEP OF PREDICTING PROBABILITY OF OCCURRENCE
OF THREAT BETWEEN BATTLEFIELD OBJECTS BASED
ON CLASSIFIED FUTURE TIMEPOINT BEHAVIOR

METHOD AND DEVICE FOR ANALYZING BATTLEFIELD THREAT BASED ON DYNAMIC GRAPH NEURAL NETWORK

CROSS-REFERENCE TO RELATED APPLICATION

This application is based on and claims priority from Korean Patent Application No. 10-2023-0073712, filed on Jun. 8, 2023, the disclosure of which is incorporated herein in its entirety by reference for all purposes.

TECHNICAL FIELD

The present disclosure relates to a method and device for analyzing a battlefield threat based on a dynamic graph neural network.

BACKGROUND

Due to the rapidly changing national security environment and changes in future warfare, the need to develop an intelligent command and control system based on the 4th Industrial Revolution is increasing. Accordingly, the importance of artificial intelligence technology, which can utilize various information from a battlefield and provide commanders with real-time analysis results of a battlefield situation, is increasing.

SUMMARY

One aspect is a method and device for analyzing a battlefield threat based on a dynamic graph neural network.

Another aspect is a method for analyzing a battlefield threat, the method including: generating a plurality of time point-specific graph data for a plurality of objects in a battlefield based on battlefield information received from an outside; calculating a latent vector for each of the plurality of objects from the graph data using a previously learned neural network model; and classifying a behavior of each of the plurality of objects based on the latent vector and predicting a threat occurrence probability between the plurality of objects based on the classified behavior.

The calculating of the latent vector includes calculating a plurality of latent vectors corresponding to each of the plurality of time points from the plurality of time point-specific graph data for a first object among the plurality of objects; and calculating a final latent vector for the first object by applying a preset weight to each of the plurality of latent vectors.

The calculating of the plurality of latent vectors includes calculating a current time point feature value for the first object; and calculating a current time point latent vector for the first object from the current time point feature value based on one or more past time point latent vectors for the first object.

The calculating of the final latent vector includes calculating the sum of the plurality of latent vectors to which the weight is applied; and calculating the final latent vector for the first object by adding the current time point latent vector among the plurality of latent vectors and the sum of the plurality of latent vectors.

The final latent vector includes an object vector for the first object and an edge vector according to connection between the first object and adjacent objects.

The neural network model includes a latent vector calculation unit and a classification unit.

The latent vector calculation unit is learned to calculate and output the latent vector of each of the plurality of objects when receiving the plurality of time point-specific graph data for each of the plurality of objects.

The classification unit is learned to classify and output a behavior for each of the plurality of objects when receiving a classification correct answer as label data along with the latent vector of each of the plurality of objects output from the latent vector calculation unit.

Moreover, the classification unit generates a loss value by comparing the classification correct answer input as the label data with an actual output classification result. Therefore, the latent vector calculation unit is learned to further receive the loss value and calculate and output the latent vector of each of the plurality of objects from the plurality of time point-specific graph data.

Another aspect is a device for analyzing a battlefield treat including: a memory where a battlefield threat analysis program is stored; and a processor, the processor executing the battlefield threat analysis program, generating a plurality of time point-specific graph data for a plurality of objects in a battlefield based on battlefield information received from an outside, calculating a latent vector for each of the plurality of objects from the graph data using a previously learned neural network model, and classifying a behavior of each of the plurality of objects based on the latent vector and predicting a threat occurrence probability between the plurality of objects based on the classified behavior.

The processor calculates a plurality of latent vectors corresponding to each of the plurality of time points from the plurality of time point-specific graph data for a first object among the plurality of objects and calculates a final latent vector for the first object by applying a preset weight to each of the plurality of latent vectors.

The processor calculates a current time point feature value for the first object and calculates a current time point latent vector for the first object from the current time point feature value based on one or more past time point latent vectors for the first object.

Moreover, the processor calculates the sum of the plurality of latent vectors to which the weight is applied and calculates the final latent vector for the first object by adding the current time point latent vector among the plurality of latent vectors and the sum of the plurality of latent vectors.

The final latent vector includes an object vector for the first object and an edge vector according to connection between the first object and adjacent objects.

The neural network model includes a latent vector calculation unit and a classification unit.

The latent vector calculation unit is learned to calculate and output the latent vector of each of the plurality of objects when receiving the plurality of time point-specific graph data for each of the plurality of objects.

The classification unit is learned to classify and output a behavior for each of the plurality of objects when receiving a classification correct answer as label data along with the latent vector of each of the plurality of objects output from the latent vector calculation unit.

Moreover, the classification unit generates a loss value by comparing the classification correct answer input as the label data with an actual output classification result. Therefore, the latent vector calculation unit is learned to further receive the loss value and calculate and output the latent vector of each of the plurality of objects from the plurality of time point-specific graph data.

According to the present disclosure, it is possible to generate the graph data that changes over time from information for the plurality of objects in the battlefield provided from the outside, and using a previously learned battlefield threat analysis model, the behavior predicted to be executed by the plurality of objects at a specific time point and the threat occurrence probability between objects can be predicted from the graph data and output as a battlefield threat analysis result.

Therefore, according to the present disclosure, it is possible to accurately perform behavior classification and threat occurrence probability prediction for each object in a battlefield environment where multiple objects interact, and thus, it is possible to provide accurate battlefield prediction information to users such as commanders, facilitating convenience in establishing operational plans.

BRIEF DESCRIPTION OF THE DRAWINGS

FIG. 4 is a flowchart of a battlefield threat analysis method according to an embodiment of the present disclosure.

DETAILED DESCRIPTION

Enemy behavior/threat identification methodologies based on multiple algorithms have been studied, but most methodologies are rule-based and have many limitations in dealing with multiple variables and changing strategies.

In addition, neural network learning-based methodologies are suitable for handling this complexity, but there is a problem in applying situational changes due to interactions between a plurality of objects with the battlefield.

The advantages and features of the present disclosure and methods for achieving them will become clear by referring to the embodiments described in detail below along with the accompanying drawings. However, the present disclosure is not limited to the embodiments disclosed below and may be implemented in various different forms. The present embodiments are provided solely to ensure that the disclosure of the present disclosure is complete and to fully inform those skilled in the art of the present disclosure of the scope of the disclosure, and the present disclosure is defined only by the scope of claims.

In describing embodiments of the present disclosure, when a detailed description of a known function or configuration is determined to unnecessarily obscure the gist of the present disclosure, the detailed description will be omitted. The terms described below are defined in consideration of functions in the embodiments of the present disclosure, and may vary depending on the intention or custom of the user or operator. Therefore, the definition should be made based on the contents throughout this specification.

Hereinafter, preferred embodiments of the present disclosure will be described in detail with reference to the attached drawings.

Figure 1:
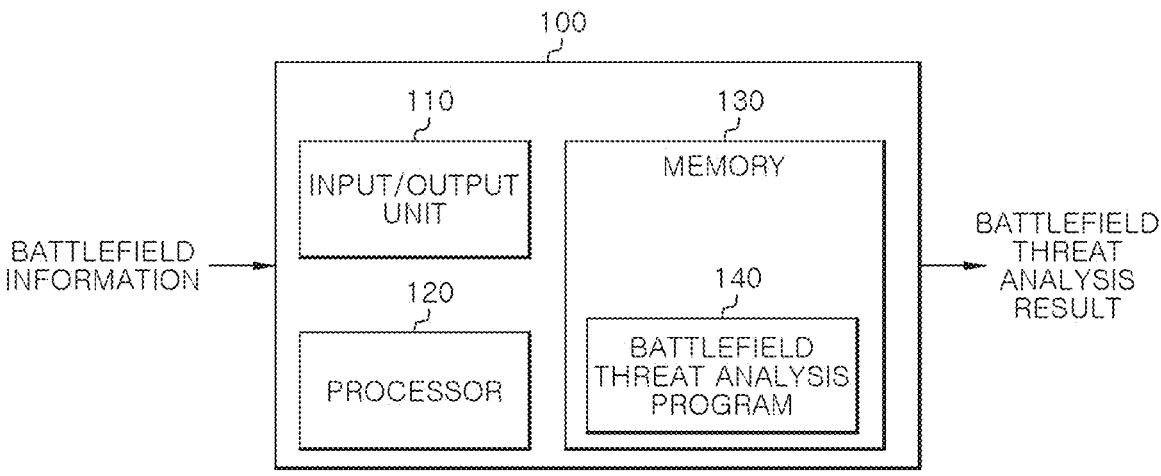
FIG. 1 is a diagram illustrating a battlefield threat analysis device according to an embodiment of the present disclosure.

FIG. 1 is a diagram illustrating a battlefield threat analysis device according to an embodiment of the present disclosure.

Referring to FIG. 1, the battlefield threat analysis device 100 of the present embodiment may include an input/output unit 110, a processor 120, and a memory 130.

The input/output unit 110 may receive battlefield information from an external device. The input/output unit 110 may provide the received battlefield information to the processor 120. Additionally, the input/output unit 110 may output a battlefield threat analysis result, which is output in response to the battlefield information by the processor 120, which will be described later, to a terminal device possessed by a user, such as a battlefield commander.

Here, the battlefield information may include object information for each of a plurality of objects in the battlefield. Moreover, the battlefield information may include edge information about an edge between the plurality of objects.

The plurality of objects may include one or more allies and enemies in the battlefield. For example, the plurality of objects may be friendly and enemy soldiers or equipment operated by the friendly and enemy soldiers in the battlefield.

The object information may include static and dynamic properties for each object. The static properties may include military branch of the object. The dynamic properties may include properties such as a position, movement direction, and speed of the object.

The edge information may include properties such as whether or not an object is observed, whether an attack is made, and the distance between at least one pair of objects, for example, one ally and one enemy connected by an edge.

The battlefield threat analysis result may include a behavior performed by each of the plurality of objects at a specific time point, for example, a future time point, and a prediction result of a threat occurrence probability between the plurality of objects according to the behavior.

The processor 120 may receive battlefield information from the input/output unit 110 and generate a battlefield threat analysis result corresponding to the battlefield information using a battlefield threat analysis program 140 stored in the memory 130, which will be described later. The processor 120 may output the battlefield threat analysis result to the input/output unit 110.

The memory 130 may store the battlefield threat analysis program 140 and information necessary for execution thereof. The battlefield threat analysis program 140 may be software including commands which can generate time series graph data for the plurality of objects in the battlefield from battlefield information provided through the input/output unit 110, and generate the battlefield threat analysis results at a specific time point based on the generated graph data, for example, the behavior performed by the plurality of objects and the analysis result including the threat occurrence probability between objects.

Accordingly, the processor 120 may execute the battlefield threat analysis program 140 stored in the memory 130 and use the analysis program to generate the battlefield threat analysis result from battlefield information received through the input/output unit 110.

Figure 2:
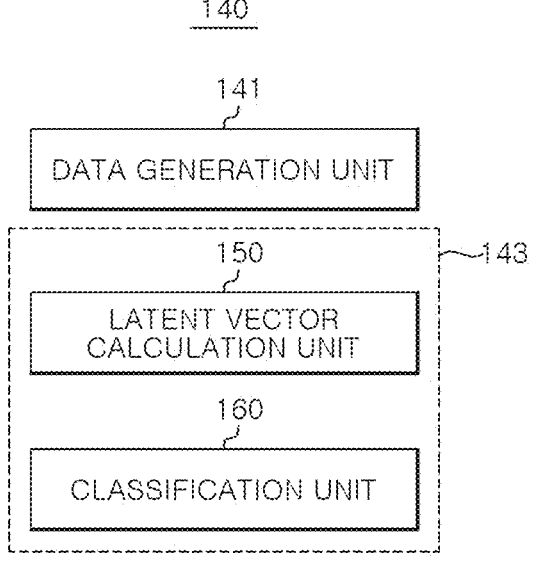
FIG. 2 is a diagram conceptually illustrating the function of a battlefield threat analysis program of FIG. 1.

FIG. 2 is a diagram conceptually illustrating the function of the battlefield threat analysis program of FIG. 1.

Referring to FIG. 2, the battlefield threat analysis program 140 of the present embodiment may include a data generation unit 141 and a battlefield threat analysis model 143. Moreover, the battlefield threat analysis model 143 may include a latent vector calculation unit (or a latent vector calculation processor) 150 and a classification unit (or a classification processor) 160.

The data generation unit 141, latent vector calculation unit 150, and classification unit 160 illustrated in FIG. 2 are conceptually divided to easily explain the function of the battlefield threat analysis program 140 of the present embodiment, and the present disclosure is not limited to this.

For example, the functions of the data generation unit 141, the latent vector calculation unit 150, and the classification unit 160 may be merged or separated, and may be implemented as a series of commands included in one program.

The data generation unit 141 may generate a plurality of graph data corresponding to each of the plurality of objects in the battlefield based on the battlefield information provided from the input/output unit 110.

The plurality of graph data may be created in time series form. For example, the data generation unit 141 may generate a plurality of graph data for each of the plurality of time points from a past time point to a current time point for one object.

As previously described, the battlefield information may include the object information and the edge information. Therefore, the plurality of graph data for each time point may also include object information and edge information for the plurality of objects in the battlefield. For example, the graph data may include a label for the object behavior defined based on the object information and a label for whether it is threat defined based on the edge information.

The battlefield threat analysis model 143 may receive the time point-specific graph data for each of the plurality of objects from the data generation unit 141, and based on the graph data, may generate the battlefield threat analysis result including a behavior of each of the plurality of objects at a specific time point, for example, a future time point, and the threat occurrence probability between the objects.

For example, the latent vector calculation unit 150 of the battlefield threat analysis model 143 can calculate a time point-specific latent vector for each object from the time point-specific graph data of each object. Moreover, the latent vector calculation unit 150 can calculate the final latent vector for the object by applying a preset weight to each time point-specific latent vector.

In addition, the classification unit 160 of the battlefield threat analysis model 143 may classify the behavior performed by each of a plurality of objects at a specific time point, for example, a future time point, based on the final latent vector of each of the plurality of objects provided by the latent vector calculation unit 150, and predict the probability of occurrence of a threat, such as an attack, between the plurality of objects based on the classified behavior.

This battlefield threat analysis model 143 may include a previously learned neutral network model to generate and output the battlefield threat analysis result including the behavior of each of the plurality of objects at a specific time point from the plurality of time point-specific graph data for the plurality of objects and the corresponding threat occurrence probability.

Figure 3:
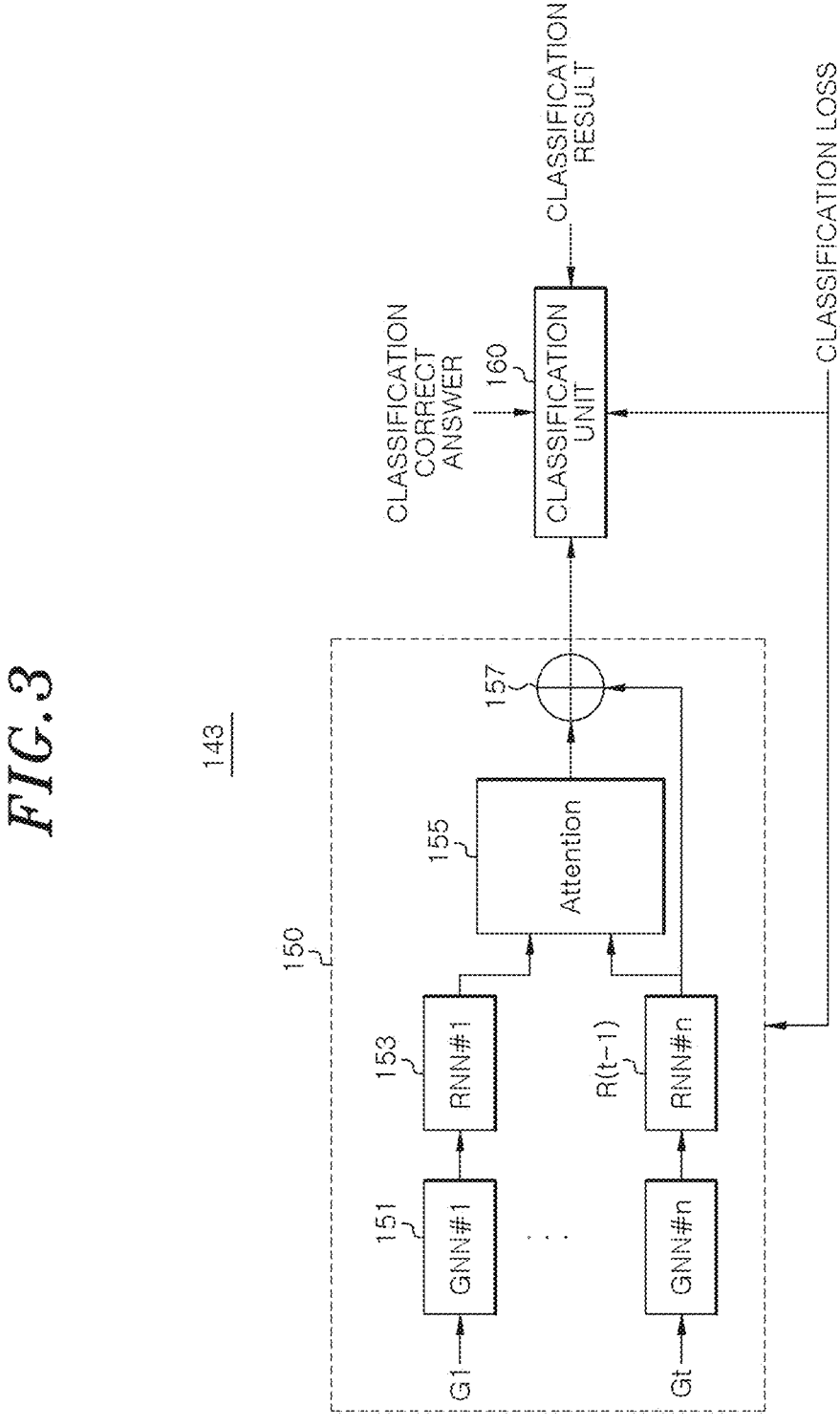
FIG. 3 is a diagram illustrating a method of learning the battlefield threat analysis model of FIG. 2.

FIG. 3 is a diagram illustrating a method of learning the battlefield threat analysis model of FIG. 2.

Referring to FIG. 3, the battlefield threat analysis model 143 of the present embodiment may include one or more previously learned neutral network models, such as the latent vector calculation unit 150 and the classification unit 160.

The latent vector calculation unit 150 includes a plurality of graph neural network (GNN) modules 151, a plurality of recurrent neural networks (RNN) 153 corresponding to each of the plurality of graph neural network modules 151, an attention module 155, and a summation unit 157.

When each of the plurality of graph neural network modules 151 receives the plurality of graph data for each of the plurality of objects from the data generation unit 141, each network module may be learned to calculate and output a plurality of feature values corresponding to each graph data.

For example, when current time point graph data for a first object is input to a first graph neural network module among the plurality of graph neural network modules 151, the first graph neural network module may calculate and output a current time point feature value of the first object corresponding to the current time point graph data.

When each of the plurality of recurrent neural network modules 153 receives a plurality of time point-specific feature values from each of the corresponding graph neural network modules 151, each recurrent neutral network module may be learned to calculate and output a plurality of latent vectors corresponding to each feature value.

For example, when the current time point feature value for the first object is input to the first recurrent neural network module among the plurality of recurrent neural network modules 153, the first recurrent neural network module may calculate and output a current time point latent vector of the first object corresponding to the current time point feature value.

In this case, one or more past time point latent vectors for the first object may be input together into the first recurrent neural network module, and the current time point latent vector of the first object may be calculated based on the current time point feature value and one or more past time point latent vectors.

For example, the first recurrent neural network module may receive a t time point feature value of the first object from the corresponding first graph neural network module, and may receive a t−1 time point latent vector of the first object from another recurrent neural network module. Accordingly, the first recurrent neural network module may calculate the t time point latent vector of the first object from the t time point feature value and the t−1 time point latent vector.

When the attention module 155 receives the plurality of time points-specific latent vectors from each of the plurality of recurrent neural network modules 153, the attention module may be learned to apply a preset weight to calculate and output the sum of the plurality of time point-specific latent vectors.

For example, the attention module 155 may receive the plurality of time point-specific latent vectors for the first object from the plurality of recurrent neural network modules 153. Accordingly, the attention module 155 may apply a preset weight to each of the plurality of time point-specific latent vectors and calculate the sum of the latent vectors of the first object by adding up the plurality of latent vectors to which the weights are applied.

The summation unit 157 may add the sum value output from the attention module 155 and the current time point latent vector of the first object provided from one of the plurality of recurrent neural network modules 153 to output a final latent vector for the first object.

Here, the final latent vector may include an object vector according to object information of the first object and an edge vector according to edge information of the first object.

In this way, the latent vector calculation unit 150 of the present embodiment may receive the plurality of time point-specific graph data for each of the plurality of objects in the battlefield, calculate the time point-specific feature value for each object and the time point-specific latent vector for each object based on the time point-specific feature value, and apply the weight to each of the calculated time point-specific latent vectors to calculate the final latent vector for each object. The latent vector calculation unit 150 may output the final latent vector of each of the plurality of objects as an input to the classification unit 160.

When the classification unit 160 receives the final latent vector of each of the plurality of objects from the latent vector calculation unit 150, the classification unit may be learned to output a result obtained by classifying the behavior expected to be performed by each of the plurality of objects at a specific time point, for example, a future time point.

Additionally, the classification unit 160 may use the output classification result to generate a classification loss for further learning the latent vector calculation unit 150 and the classification unit 160 described above.

To this end, the classification unit 160 may receive a classification correct answer, that is, a behavior actually performed by each of the plurality object at a specific time point, along with the final latent vector for each of the plurality of objects. Accordingly, the classification unit 160 may compare the classification correct answer with the actually output classification result and determine the classification loss value according to the comparison result.

Therefore, the classification unit 160 provides the determined classification loss value to the latent vector calculation unit 150 and the classification unit 160, so that learning to minimize the classification loss value in each of the latent vector calculation unit 150 and classification unit 160, that is, learning to calculate the final latent vector for each of a plurality of objects and learning to predict and learning to classify the behavior of each of the plurality of objects at a specific time point based on the final latent vector may be performed repeatedly.

Accordingly, the battlefield threat analysis model 143 may predict the probability of occurrence of a threat, such as an attack, between the plurality of objects, such as allies and enemies, at the specific time point, based on the classification result of the object behavior of the specific time point output from the classification unit 160. The battlefield threat analysis model 143 may generate and output the battlefield threat analysis result including the behavior classification result and the resulting threat occurrence probability.

In this way, the battlefield threat analysis device 100 of the present embodiment may generate the graph data that changes over time from information about the plurality of objects in the battlefield provided externally, and predict the behavior expected to be performed by the plurality of objects at a specific time point and the corresponding threat occurrence probability between the objects from the graph data using the previously learned battlefield threat analysis model 143 to output the behavior and the threat occurrence probability as the battlefield threat analysis result.

Accordingly, the present disclosure may accurately perform the behavior classification and the threat occurrence probability prediction for each object in the battlefield environment where multiple objects interact, and thus, it is possible to provide accurate battlefield prediction information to users such as commanders, facilitating convenience in establishing operational plans.

FIG. 4 is a flowchart of a battlefield threat analysis method according to an embodiment of the present disclosure.

Referring to the drawing, first, the battlefield information about the battlefield may be received from an external device to the input/output unit 110 of the battlefield threat analysis device 100.

Here, the battlefield information may include the plurality of objects in the battlefield, for example, object information about one or more friendly and enemy objects, and edge information about an edge between at least one pair of objects.

The processor 120 of the battlefield threat analysis device 100 executes the battlefield threat analysis program 140 stored in the memory 130 and uses the program to generate and output the analysis result for the battlefield at a specific time point from the battlefield information provided from the input/output unit 110.

For example, the data generation unit 141 may generate the plurality of graph data corresponding to each of the plurality of objects in the battlefield based on battlefield information (S10).

Here, the plurality of graph data corresponding to each of the plurality of objects may be in the form of a time series, and may be generated for each plurality of time points from the past time point to the current time point for one object.

Figure 5:
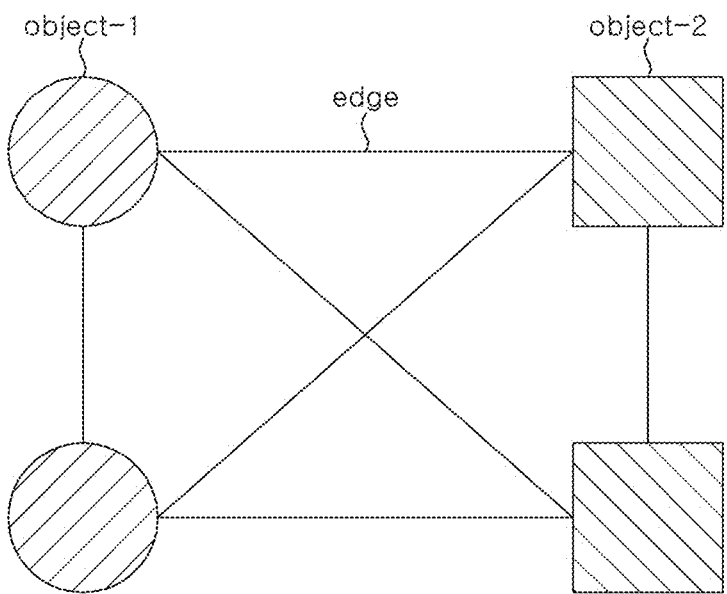
FIG. 5 is a diagram illustrating an example of graph data according to an embodiment of the present disclosure.

FIG. 5 is a diagram illustrating an example of graph data according to an embodiment of the present disclosure.

Referring to FIG. 5, the graph data may be generated based on battlefield information to correspond to a plurality of objects in the battlefield, for example, one or more friendly object object-1 and enemy object object-2.

Here, the battlefield information may include object information for each friendly object object-1 and enemy object object-2, and edge information about connecting an edge between at least one pair of objects of the friendly object object-1 and the enemy object object-2.

Accordingly, the data generation unit 141 may generate graph data including a label for object behavior defined based on object information and a label for threat presence defined based on edge information.

Referring again to FIG. 4, the battlefield threat analysis model 143 may calculate and output the latent vector of each object from a plurality of graph data for each of the plurality of objects (S20).

For example, the latent vector calculation unit 150 of the battlefield threat analysis model 143 may receive the plurality of time point-specific graph data for each of the plurality of objects in the battlefield as input, calculate the time point-specific feature value for each object and the time point-specific latent vector for each object based on the time point-specific feature value, and apply the weight to each of the calculated time point-specific latent vectors to calculate the final latent vector for each object.

Here, the latent vector calculation unit 150 may calculate the current time point latent vector of each of the plurality of objects based on one or more past time point latent vectors of each object.

For example, the latent vector calculation unit 150 may calculate the $t$ time point feature value of the first object from the plurality of graph data for the first object among the plurality of objects. Subsequently, the latent vector calculation unit 150 may calculate the current time point latent vector for the first object based on the calculated $t$ time point feature value and one or more past time point latent vectors, for example, the $t-1$ time point latent vector.

Subsequently, the classification unit 160 of the battlefield threat analysis model 143 may receive the final latent vector of each of the plurality of objects from the latent vector calculation unit 150, and classify and output the behavior predicted to be performed by each of the plurality of objects at a specific time point, for example, a future time point (S30).

Accordingly, the battlefield threat analysis model 143 may predict the probability of occurrence of a threat, such as an attack, between a plurality of objects, such as allies and enemies, at the specific time point based on the results obtained by classifying the object behavior at the specific time point (S40).

Additionally, the battlefield threat analysis model 143 may generate and output the battlefield threat analysis result including the behavior classification result and the resulting threat occurrence probability. Subsequently, the processor 120 may output the battlefield threat analysis result of a specific time point output from the battlefield threat analysis model 143 to a terminal device owned by a user such as a commander of the battlefield through the input/output unit 110.

As described above, according to the battlefield threat analysis method of the present embodiment, it is possible to generate the graph data that changes over time from information for the plurality of objects in the battlefield provided from the outside, and using the previously learned battlefield threat analysis model 143, the behavior predicted to be executed by the plurality of objects at a specific time point and the threat occurrence probability between objects can be predicted from the graph data and output as the battlefield threat analysis result.

Therefore, according to the present disclosure, it is possible to accurately perform behavior classification and threat occurrence probability prediction for each object in a battlefield environment where multiple objects interact, and thus, it is possible to provide accurate battlefield prediction information to users such as commanders, facilitating convenience in establishing operational plans.

Combinations of each block of the block diagram of the present disclosure and each step of the flow chart described above may be performed by computer program instructions. Since these computer program instructions can be mounted on the encoding processor of a general-purpose computer, special-purpose computer, or other programmable data processing equipment, the instructions performed through the encoding processor of a computer or other programmable data processing equipment create a means of performing the functions described in each block of the block diagram or each step of the flowchart. These computer program instructions may also be stored in computer-usable or computer-readable memory that can be directed to a computer or other programmable data processing equipment to implement a function in a particular way, so that the instructions stored in the computer-usable or computer-readable memory may produce manufactured items including instruction means for performing the functions described in each block of the block diagram or each step of the flowchart. The computer program instructions can also be mounted on a computer or other programmable data processing equipment, so that a series of operational steps are performed on the computer or other programmable data processing equipment to create a process that is executed by the computer, and instructions for executing a computer or other programmable data processing equipment may also provide steps for executing functions described in each block of the block diagram and each step of the flowchart.

Additionally, each block or each step may represent a module, segment, or portion of code that includes one or more executable instructions for executing specified logical function(s). Additionally, it should be noted that in some alternative embodiments it is possible for the functions mentioned in the blocks or steps to occur out of order. For example, it is possible that two blocks or steps illustrated in succession may in fact be performed substantially simultaneously, or the blocks or steps may sometimes be performed in reverse order depending on the corresponding function.

The above description is merely an illustrative explanation of the technical idea of the present disclosure, and those skilled in the art will be able to make various modifications and variations without departing from the essential quality of the present disclosure. Accordingly, the embodiments disclosed in the present disclosure are not intended to limit the technical idea of the present disclosure, but are for illustrative purposes, and the scope of the technical idea of the present disclosure is not limited by these embodiments. The scope of protection of the present disclosure shall be interpreted in accordance with the claims below, and all technical ideas within the scope equivalent thereto shall be construed as being included in the scope of rights of the present disclosure.

What is claimed is:

1. A computer-implemented method performed by a battlefield threat analysis device comprising an input/output unit, a memory storing a battlefield threat analysis program, and a processor configured to execute the program for analyzing a battlefield threat, the method comprising:

receiving, via the input/output unit, battlefield information including object information and edge information for each of a plurality of objects in a battlefield from an external device, and by a data generation unit executed by the processor, generating a plurality of time point-specific graph data for the plurality of objects from past to a current time point;

calculating, for each object, a plurality of time point-specific feature values and a plurality of time point-specific latent vectors, corresponding to the plurality of time point-specific feature values, by a latent vector calculation unit comprising a plurality of graph neural network (GNN) modules and a plurality of corresponding recurrent neural network (RNN) modules, the calculating including:

i) generating, by the GNN modules, the time point-specific feature values from the plurality of time point-specific graph data of each object, and ii) generating, by the RNN modules, the time point-specific latent vectors for each object based on the corresponding feature values and one or more past time point latent vectors using a previously learned neural network model, wherein calculating the latent vectors includes calculating a final latent vector for each object by applying a preset weight to each of the plurality of time point-specific latent vectors of each object, and wherein calculating the final latent vector includes:

calculating a sum of the plurality of time point-specific latent vectors to which the preset weight is applied, and calculating the final latent vector for each object by adding the current time point latent vector among the plurality of time point-specific latent vectors and the sum of time point-specific latent vectors;

classifying by a classification unit of the neural network model, a predicted behavior of each of the plurality of objects at a specific time point, including a future time point, based on the corresponding final latent vectors, and predicting, by the classification unit, a threat occurrence probability between the plurality of objects at the future time point based on the classified behaviors; and outputting, via the input/output unit, a battlefield threat analysis result comprising the behavior classification and the predicted threat occurrence probability to a user terminal for providing battlefield prediction information to a battlefield commander and facilitating convenience in establishing operational plans.

2. The method of claim 1, wherein calculating the latent vector includes:

calculating a current time point feature value for each object from current time point graph data among the plurality of time point-specific graph data of each object; and calculating a current time point latent vector for each object from the current time point feature value based on one or more past time point latent vectors among the plurality of time point-specific latent vectors of each object.

3. The method of claim 1, wherein the final latent vector includes an object vector for each object and an edge vector according to connection between each object and adjacent objects.

4. The method of claim 1, wherein the neural network model includes a latent vector calculation unit and a classification unit, wherein the latent vector calculation unit is learned to calculate and output the plurality of time point-specific latent vectors for each of the plurality of objects in response to receiving the plurality of time point-specific graph data for each of the plurality of objects, and wherein the classification unit is learned to classify and output a behavior for each of the plurality of objects in response to receiving a classification correct answer as label data along with the plurality of time point-specific latent vectors of each of the plurality of objects output from the latent vector calculation unit.

5. The method of claim 4, wherein the classification unit generates a loss value by comparing the classification correct answer input as the label data with an actual output classification result, and wherein the latent vector calculation unit is learned to further receive the loss value and calculate and output the plurality of time point-specific latent vectors for each of the plurality of objects from the plurality of time point-specific graph data.

6. A non-transitory computer-readable recording medium storing instructions, when executed by one or more processors, that cause the one or more processors to perform the method of claim 1.

7. The method of claim 1, wherein the preset weight applied to the plurality of time point-specific latent vectors is determined by an attention module trained as part of the previously learned neural network model.

8. The method of claim 1, wherein the classification unit determines a classification loss value by comparing the predicted behavior with a classification correct answer for the specific time point, and provides the classification loss value to the latent vector calculation unit and the classification unit for further learning to minimize the classification loss value.

9. A device for analyzing a battlefield threat, the device comprising:

an input/output unit;

a memory configured to store a battlefield threat analysis program; and one or more processors configured to execute the battlefield threat analysis program to:

receive, via the input/output unit, battlefield information including object information and edge information for each of a plurality of objects in a battlefield from an external device, and by a data generation unit executed by the one or more processors, generating a plurality of time point-specific graph data for the plurality of objects from past to a current time point;

calculate, for each object, a plurality of time point-specific feature values and a plurality of time point-specific latent vectors, corresponding to the plurality of time point-specific feature values, by a latent vector calculation unit comprising a plurality of graph neural network (GNN) modules and a plurality of corresponding recurrent neural network (RNN) modules, by:

i) generating, by the GNN modules, the time point-specific feature values from the plurality of time point-specific graph data of each object, and ii) generating, by the RNN modules, the time point-specific latent vectors for each object based on the corresponding feature values and one or more past time point latent vectors, using a previously learned neural network model, wherein in calculating the latent vectors, the one or more processors are configured to calculate a final latent vector for each object by applying a preset weight to each of the plurality of time point-specific latent vectors of each object, and wherein in calculating the final latent vector, the one or more processors are configured to:

calculate a sum of the plurality of time point-specific latent vectors to which the preset weight is applied, and calculate the final latent vector for each object by adding the current time point latent vector among the plurality of time point-specific latent vectors and the sum of time point-specific latent vectors;

classify by a classification unit of the neural network model, a predicted behavior of each of the plurality of objects at a specific time point, including a future time point, based on the corresponding final latent vectors, and predicting, by the classification unit, a threat occurrence probability between the plurality of objects at the future time point based on the classified behaviors; and output, via the input/output unit, a battlefield threat analysis result comprising the behavior classification and the predicted threat occurrence probability to a user terminal for providing battlefield prediction information to a battlefield commander and facilitating convenience in establishing operational plans.

10. The device of claim 9, wherein at least one of the one or more processors is configured to:

calculate a current time point feature value for each object from current time point graph data among the plurality of time point-specific graph data of each object, and calculate a current time point latent vector for each object from the current time point feature value based on one or more past time point latent vectors among the plurality of time point-specific latent vectors of each object.

11. The device of claim 9, wherein the final latent vector includes an object vector for each object and an edge vector according to connection between each object and adjacent objects.

12. The device of claim 9, wherein the neural network model includes a latent vector calculation unit and a classification unit, wherein the latent vector calculation unit is configured to be learned to calculate and output the plurality of time point-specific latent vectors for each of the plurality of objects in response to receiving the plurality of time point-specific graph data for each of the plurality of objects, and wherein the classification unit is configured to be learned to classify and output a behavior for each of the plurality of objects in response to receiving a classification correct answer as label data along with the plurality of time point-specific latent vectors of each of the plurality of objects output from the latent vector calculation unit.

13. The device of claim 12, wherein the classification unit is configured to generate a loss value by comparing the classification correct answer input as the label data with an actual output classification result, and wherein the latent vector calculation unit is configured to be learned to further receive the loss value and calculate and output the plurality of time point-specific latent vectors for each of the plurality of objects from the plurality of time point-specific graph data.

\*    \*    \*    \*    \*